United States Patent [19]

Shyi-Hon

[11] Patent Number: 5,262,933
[45] Date of Patent: Nov. 16, 1993

[54] CONTROL CIRCUIT FOR DUAL POWER SUPPLY HAVING DIFFERENT START-UP OPERATING VOLTAGES

[75] Inventor: Chen Shyi-Hon, Taipei, Taiwan
[73] Assignee: Acer Incorporated, Taipei, Taiwan
[21] Appl. No.: 928,847
[22] Filed: Aug. 11, 1992
[51] Int. Cl.⁵ .......................................... H02M 3/335
[52] U.S. Cl. ....................................... 363/49; 363/21; 363/71
[58] Field of Search ................... 363/21, 49, 65, 71, 363/72

[56] References Cited
FOREIGN PATENT DOCUMENTS 61-258672 11/1986 Japan .
3-273864 12/1991 Japan .
4-8165 1/1992 Japan .
4-69057 3/1992 Japan .

Primary Examiner—William H. Beha, Jr.
Attorney, Agent, or Firm—Kenneth M. Kaslow

[57] ABSTRACT

A control circuit for a switching power supply. First and second transformers for outputting different voltages are controlled by first and second switches. The switches are controlled by first and second control means which are turned on when the applied voltage exceeds a specified start-up voltage, and off when the voltage drops below a lower shut-down voltage. A reference voltage charges a capacitor, which is then added to the operating voltage of the circuit so that the start-up voltage can be applied even though the operating voltage of the circuit is lower than the start-up voltage. A third control means controls the change from one switch to the other at the desired voltage levels. The use of lower operating voltages allows the circuit to more rapidly drop below the shut-down voltage when abnormal operation occurs.

23 Claims, 6 Drawing Sheets

CONTROL CIRCUIT FOR DUAL POWER SUPPLY HAVING DIFFERENT START-UP OPERATING VOLTAGES

BACKGROUND OF THE INVENTION

1. Field of the Invention

The present invention relates to a dual switching power supply (SPS) system and more particularly to the control circuit of a dual switching power supply system.

2. Description of Related Art

A dual switching power supply system is employed when an electronic system requires a variable voltage as an input. For instance, a monitor system which may accept multiple frequencies requires different horizontal deflection voltages to correspond to the different horizontal synchronization frequencies of the input video signal. In situations such as this, a dual switching power supply system is generally used. A first set of switching power supplies is used to generate fixed voltages required to power the different elements in the monitor system. A second set of switching power supplies is used to generate a variable voltage needed.

In accordance with most conventional systems, the control circuit of the first SPS set is independent from that of the second SPS set. The second SPS set is activated and outputs power only after the first SPS set is activated and outputs power normally.

In order to provide reference voltages, to provide an oscillation signal, to drive the switch such as a MOS transistor, to provide amplifier function and compensation etc., a commercially available integrated circuit (IC), such as Part No. UC3842 from S.T. Co. or Unitrode Co., is most frequently used in the design of the control circuit of a switching power supply system. In this technical field, the UC3842 chip is referred as a Current Mode Pulse Width Modulation Controller. This kind of control IC is designed such that it is only activated when the power supply is increased to a voltage called start-up voltage. The start-up voltage of the UC3842 is about 17.5 volts. However, after the UC3842 is activated, it may operate as expected even if the power supply drops below start-up voltage, as long as the power supply is above a shut-down voltage. The shut-down voltage of the UC3842 is about 8.5 volts. Further information on UC3842, is publicly available.

In a conventional dual switching power supply system, the auxiliary power output of the first SPS set is provided not only to power the control IC itself, but to power the second set of the control IC. As a result, the auxiliary power output must be equal to or greater than the start-up voltage. In the system of this kind, not only is the voltage stress the electronic element takes higher than desired but so is the power loss, due to the higher operation voltage which is equal to or greater than the start-up voltage. Also, due to the higher operating voltage, critical components such as a power MOS are more easily broken down if the switching power supply operates abnormally, such as with an over current or dead short circuit of the output terminals of the transformer. Such critical conditions can only be avoided through implementation of a protection circuit which requires additional efforts and costs.

As shown in FIG. 1, the conventional dual switching power supply system comprises a first transformer set 111 and second transformer set 112. The first transformer set 111 has a primary coil 113 which is selectively energized through control of the ON/OFF state of a first switch 115. The second transformer set 112 has a primary coil 114 which is selectively energized through control of the ON/OFF state of a second switch 116. The first and second switch have first and second control input terminals respectively.

The control circuit of the dual switching power supply system, as shown in FIG. 1, in general, comprises a first control circuit 11, second control circuit 12 and associated circuits. The first and second control circuits 11, 12 may be off-the-shelf integrated circuits available in the marketplace. For instance, a Part No. UC3842 control IC manufactured by Unitrode Co. is frequently used in the design of the control circuit of a dual switching power supply system. The functions of the control IC, such as UC3842, at least include providing a reference voltage at the output pin 8, providing an oscillation signal to operate the internal circuit of the control IC and therefore to generate the switching signal needed at the output pin 6 and providing amplifier function and feed forward compensation. The pin 7 is an input Vcc pin which is coupled to an input direct current source B+. As the control IC's 11, 12 are implemented in the control circuit of the switching power supply system, the output signals of the output pin 6 are coupled to the first and second control input terminals of the first switch 113 and second switch 116 respectively. According to the conventional design, the output signal Va of a primary output coil 117 of the first transformer set is coupled to the node C of the control circuit 11 through a diode 120, and the output signal Va is input to the input Vcc pin 7 of the control circuit 12. The power B+ functions to start up the control IC 11. The control IC such as UC3842 is designed in such a way that it is activated when the input voltage to the Vcc pin 7 is increased to a voltage called start-up voltage. After the UC3842 has been activated, it may operate as designed even if the input voltage at the node C drops below the start-up voltage, as long as the input to pin 7 is still above a shut-down voltage. The function of the capacitor 118 is to store a charge during the time when the power B+ is sourcing the current into the control circuit 11. The capacitor 119 is used to store the charges during the time when the output of the primary output coil 117 is sourcing current into the control circuit 11. The diodes 120 and 121 are used to prohibit the charges of capacitors 118, 119 from being discharged in the right hand direction. The components of the control circuit, such as the resistor R1, etc. in FIG. 1 are chosen in a way such that the response curve of the voltage at the node C has the shape shown in FIG. 7. The Vst is the start-up voltage required to activate the control IC 11 or 12. The Vsh is the shut-down voltage than which the input voltage to the pin 7 of the control IC must be greater for the control IC to function. As shown in FIG. 7, during the period of t0 to t1, the input B+ provides currents to the control IC 11 and the capacitor 118 builds up its voltage. During the period of t1 to t2, the control IC sinks additional currents from the capacitor 118 and the voltage at node C is decreasing. During this time, the diode 120 is not conducting. At a time just before t2, the control IC 11 starts to output the switching signal to the gate of the switch 115. Therefore, the primary output coil 117 begins to provide voltage and current to the associated components and the diode 120 is conducting. As a result, after t2 the voltage at the node C begins to increase to a steady state voltage value due to the charging phenomenon of capacitors 118, 119 by the output current of the primary output coil 117. The steady state operating voltage of the conventional design in FIG. 1 must be 17.5 volts at least. After the first transformer set 111 and associated circuits function normally, the control IC 12 commences to activate due to the input voltage Va at the pin 7 which is substantially 17.5 volts. It is obvious that, in the conventional design like that in FIG. 1, the voltage stress the components take is high and the power loss, as a result, is also substantial. In addition, once there is an abnormal operating situation, such as an over current a or dead short of the output terminals of the transformer set, it is far more safe to all components in control circuit if the operating voltage drops immediately below the shut-down voltage which is 8.5 volts for UC3842. However, the voltage at the node A or C can hardly drop to a level below the shut-down voltage according to the conventional design as shown in FIG. 1.

SUMMARY OF THE INVENTION

Accordingly, in order to solve the above defects associated with the conventional systems, it is a principal object of the present invention to provide a control circuit of a dual switching power supply system to lower the operating voltage of the control IC.

The control circuit of the invention provides a voltage which is enough to activate the first and second sets of the dual switching power supply system initially and then the voltage drops to a level above the shut-down voltage as the power supply system is operated in a normal condition, and the voltage drops to a level well below the shut-down voltage if the power supply system is operated abnormally.

The dual switching power supply system has a first transformer set and second transformer set selectively energized through control state of the ON/OFF state of a first and second switch respectively. The first and second switch have first and second control input terminals respectively.

The control circuit of the invention preferably comprises a first control circuit for controlling the ON/OFF state of the first switch, wherein the first control circuit has a first input terminal for receiving a first power input, a first output terminal for outputting a first switch control signal to the first control input terminal and a second output terminal for outputting a reference voltage, and the first control circuit is turned ON when the first power input exceeds a start-up voltage and is turned OFF when the first power input drops below a shut-down voltage; a second control circuit for providing a power source in response to the first power input and the reference voltage; a third control circuit for controlling the ON/OFF state of the second switch, wherein the third control circuit has a first input terminal for receiving the power source, a first output terminal for outputting a second switch control signal to the second control input terminal, and the third control circuit is turned ON when the power source exceeds the start-up voltage and is turned OFF when the power source drops below the shut-down voltage. The power source rises from zero voltage to a level above the start-up voltage, thereby turning ON the third control circuit, as the first power input is supplied. The power source drops to a level above the shut-down voltage as the power supply system is operated in a normal condition. The power source drops to a level below the shut down voltage, thereby turning OFF the third control circuit, if the power supply system is operated abnormally.

A further understanding of the nature and advantage of the present invention may be further realized by reference to the Detailed Description of the Invention and the attached Drawings.

DETAILED DESCRIPTIONS OF THE INVENTION

Figure 2:
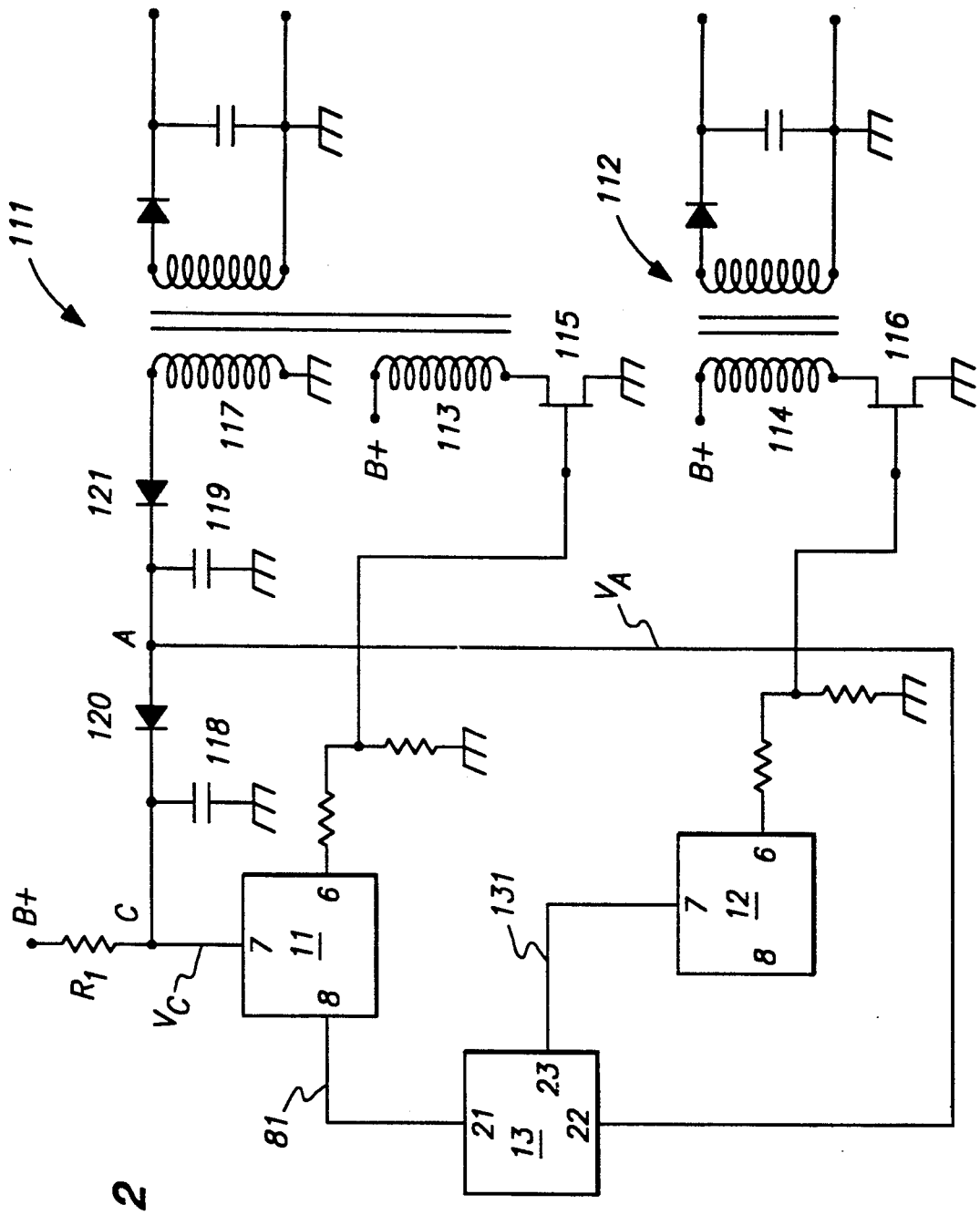
FIG. 2 shows a preferred embodiment of control circuit of a dual switching power supply system in accordance with the present invention.

Referring to FIG. 2, the control circuit of the present invention comprises a first control circuit 11, a second control circuit 13 and a third control circuit 12. The first control circuit 11 has a first output terminal 6 for outputting a first switch control signal to the first control input of the first switch 115 in order to control the ON/OFF state of the first switch 115. The first control circuit 11 has a first input terminal 7 for receiving a first power input Vc and a second output terminal 8 for outputting a reference voltage signal 81. The first control circuit 11 is turned ON when the first power input Vc exceeds a start-up voltage and is turned OFF when the first power input drops below a shut-down voltage.

The second control circuit 13 receives an output voltage Va from a primary output coil 117 and the reference voltage 81 and provides a power source signal 131 which is initially above the start-up voltage and then decays to a working voltage substantially greater than the shut-down voltage by a predetermined amount.

The third control circuit 12 has a first output terminal 6 for outputting a second switch control signal to the second control input of the second switch 116 in order to control the ON/OFF state of the second switch 116. The third control circuit 12 has a first input terminal 7 for receiving the power source signal 131. The third control circuit 12 is turned ON when the power source 131 exceeds a start-up voltage and is turned OFF when the power source 131 drops below a shut-down voltage.

Figure 1:
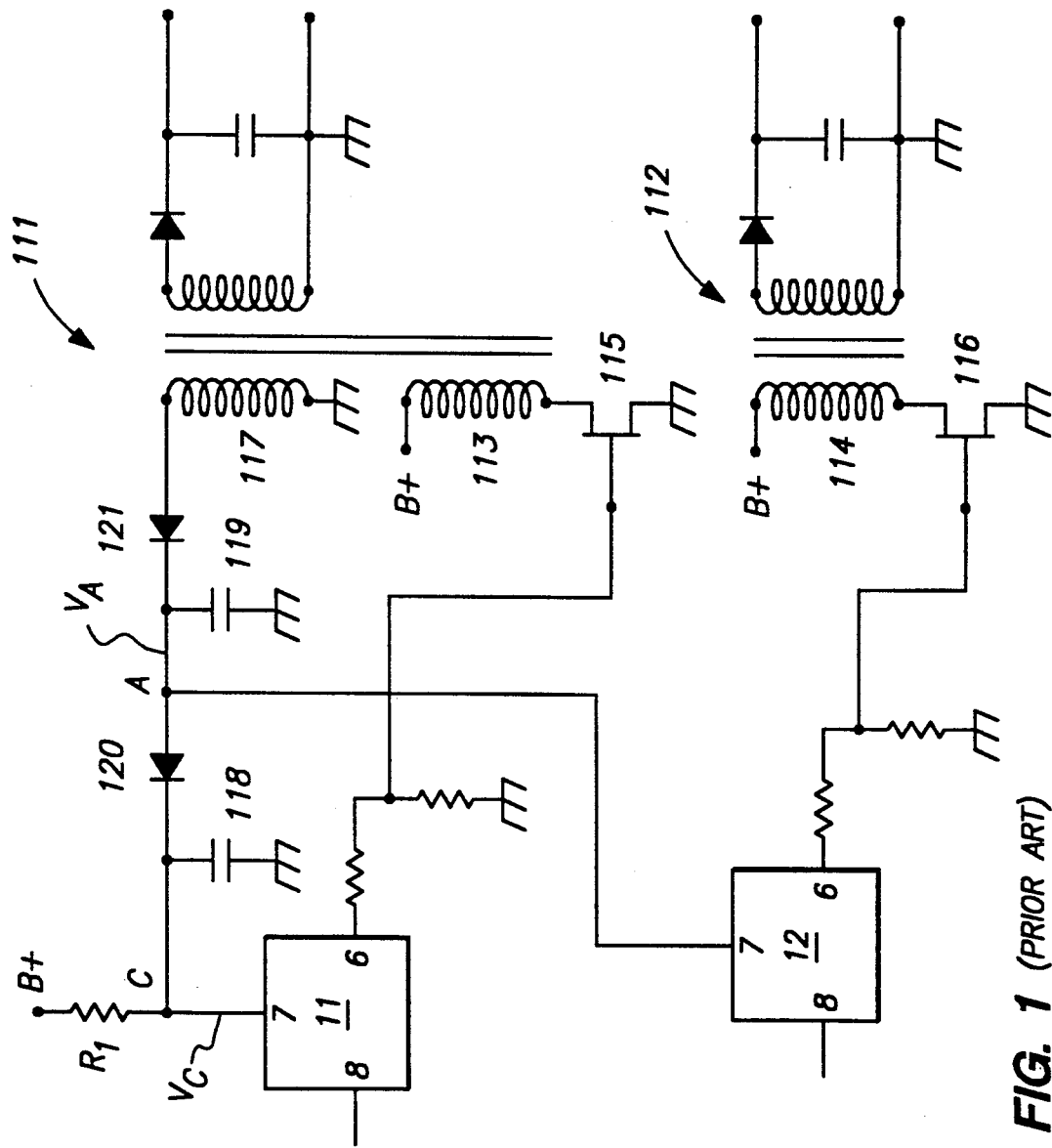
FIG. 1 shows a control circuit of a dual switching power supply system in accordance with the prior art.

It is evident that the rest of associated circuits in FIG. 2 is the same as that in FIG. 1 and therefore further recitation is unnecessary.

In a preferred embodiment, the first or second switch 115, 116 may be a Metal Oxide Semiconductor (MOS) transistor.

Figure 3:
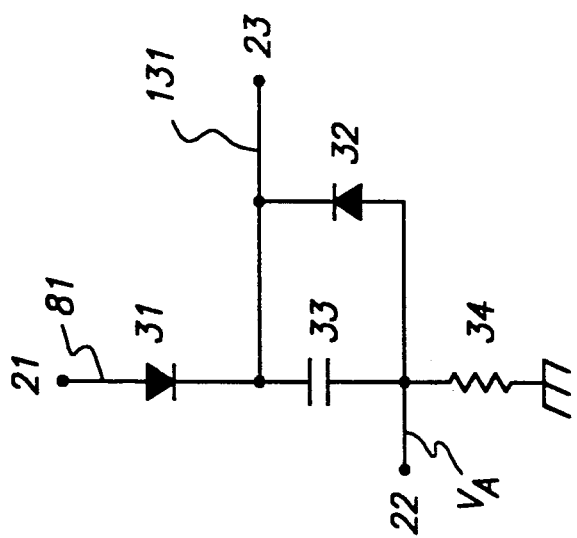
FIG. 3 shows a preferred embodiment of the circuit block 13 of FIG. 2.

A preferred embodiment of the second control circuit 13 is shown in FIG. 3. The second control circuit 13 comprises a first diode 31, a capacitor 33 and a second diode 32. The first diode 31 has an anode coupled to the reference voltage signal 81, and a cathode. The capacitor 33 has a positive plate coupled to the cathode of the diode 31 and a negative plate coupled to ground through a resistor 34. The negative plate is coupled to the power input signal Va. The second diode 32 has a cathode coupled to the cathode of the first diode 31 and is interposed between the cathode of the first diode 31 and the negative plate of the capacitor 33. The output power source 131 is taken at the positive plate of the capacitor 33.

The reference voltage signal 81 from the control IC UC3842 is a 5 volts signal. As the first power input Vc is increased from zero volt to a level above the start-up voltage, the reference voltage 81 of 5 volts is output to the input 21 of the control circuit 13. Therefore, a voltage of 4.3 volts is then built across the capacitor 33. As the primary output voltage Va begins to input the control circuit 13 through input 22, the voltage of the negative plate of the capacitor 33 is increased by an amount of Va value. As a result, the output voltage 131 at the terminal 23 has a value of 4.3+Va volts. As the control circuit 12 has a start-up voltage of 17.5 volts, a Va voltage of 13.2 volts is enough to activate the control circuit 12. The control circuit 12 is activated by the initial 17.5 volts and sinks current from the capacitor 33. The diode 32 is not conducting at this stage. After the discharge process of the capacitor 33 has completed, the voltage Va takes over to provide current to the control circuit 12 and the diode 32 is conducting at this stage. The variations of the voltage V33 across the capacitor 33, signals Va and 131 against time are shown in FIG. 8.

Figure 8:
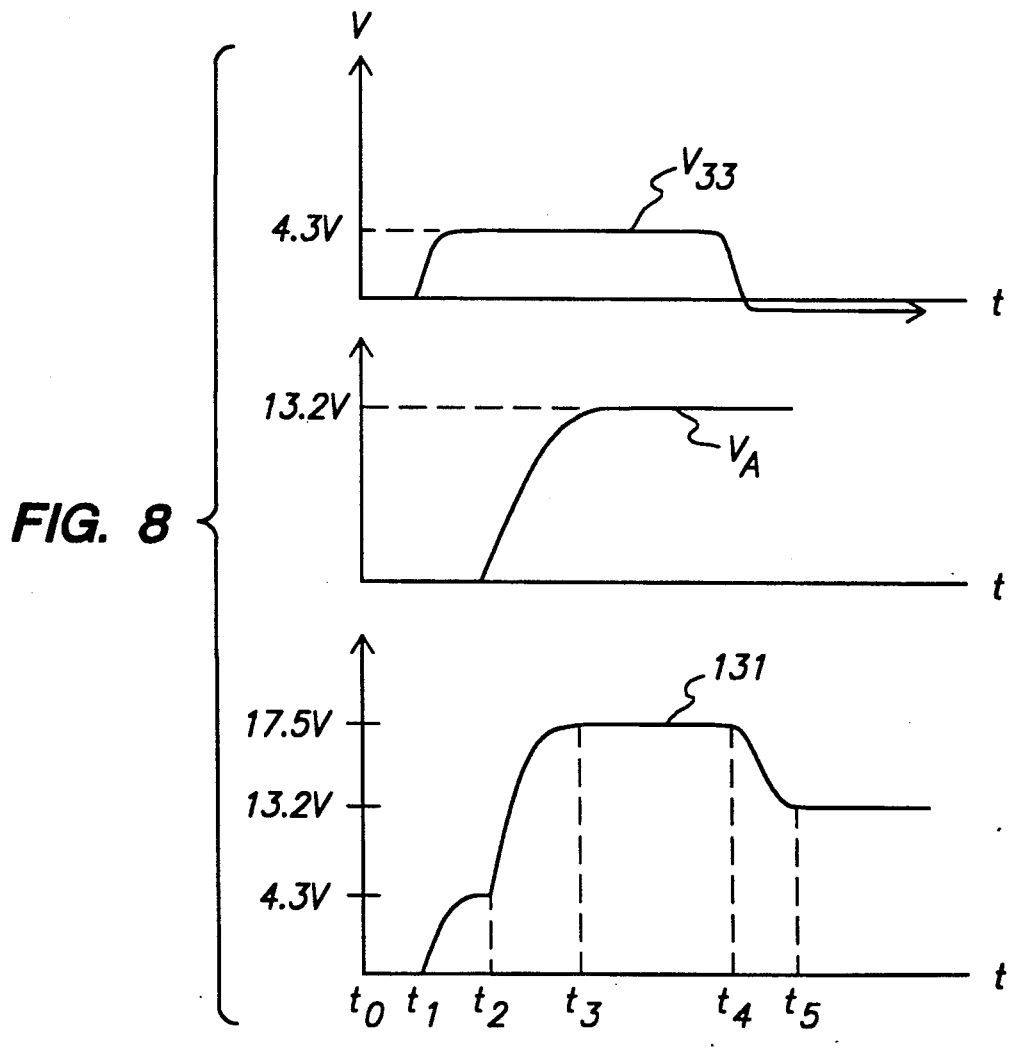
FIG. 8 shows variation of the voltage signals in FIG. 2 and 3.

From FIG. 3 and FIG. 8, it can be seen from time t1 to t2 the capacitor 33 is building its voltage. From time t2 to t3, the voltage Va is coming in and at time t3 the signal reach its maximum of 17.5 volts. This voltage, which is equal to or greater than the start-up voltage of the control circuit 12, then activates the control circuit 12. During the initial operation of control circuit 12, it sinks current from the capacitor 33 so the voltage across the capacitor 33 begins to drop significantly at t4, and the voltage V33 becomes zero at time t5. Therefore the signal 131 substantially reaches its steady state 13.2 volts and the signal Va provides the power needed to run the control circuit 12 after the time t5.

Contrary to the conventional design which must provide a Va of 17.5 volts, the dual switching power supply system of the present invention may be operated by a much smaller value of Va, which is 13.2 volts. It is shown that the signal 131 is gradually increased from zero to 4.3 and to 17.5 and then drops to 13.2 volts.

Once there is an abnormal operating situation, such as an over current or dead short of the output terminals of the transformer set, it is easily seen that the operating voltage of 13.2 volts may drop immediately below the shut-down voltage which is 8.5 volts for UC 3842. This benefit avoids any possible damage to related components in the circuits.

Figure 4:
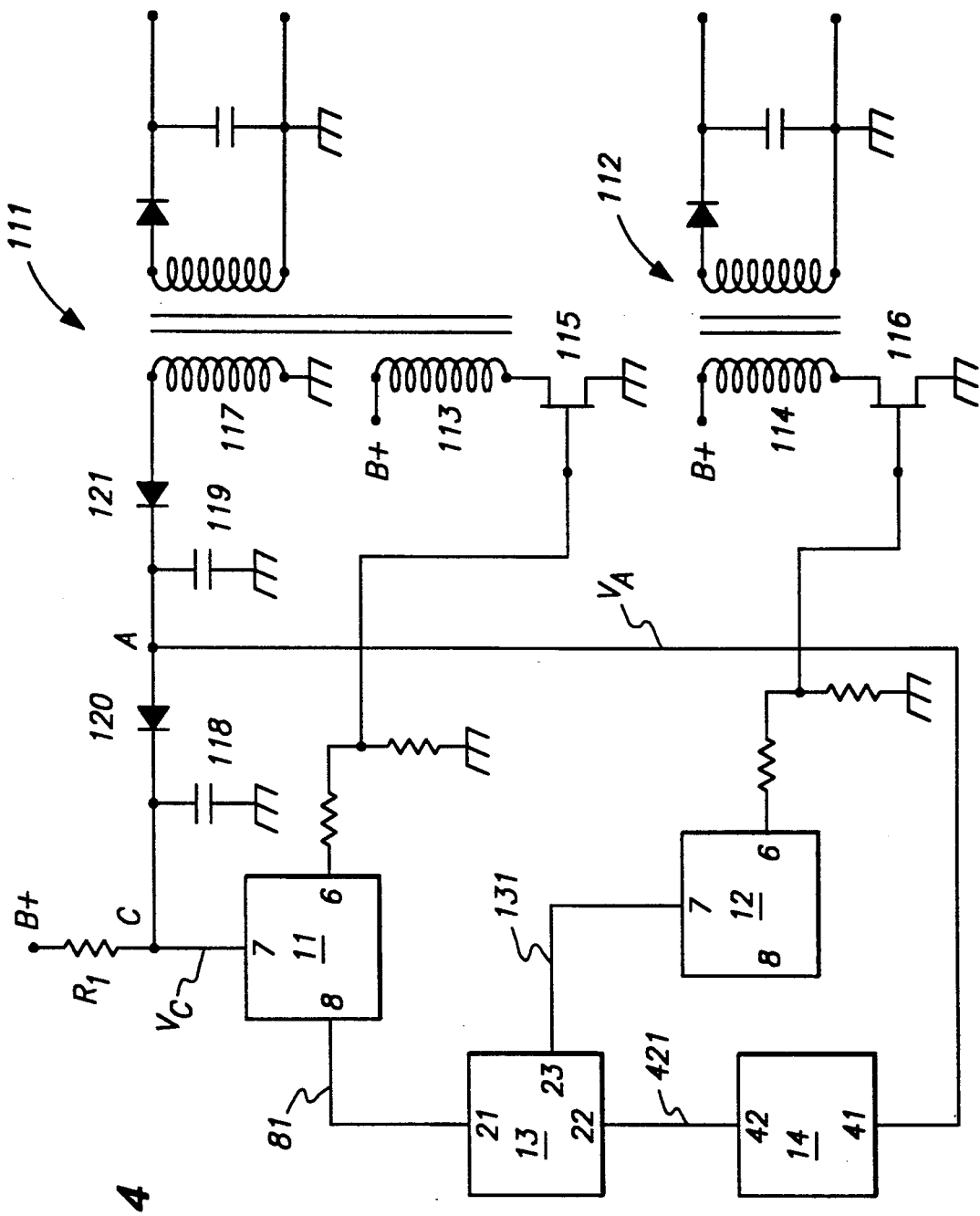
FIG. 4 shows another preferred embodiment of control circuit of a dual switching power supply system in accordance with the present invention.

A second preferred embodiment of the invention is disclosed in FIG. 4. The shown embodiment comprises a first control circuit 11, a second control circuit 12, a switch circuit 14 and a third control circuit 13. The functions and operations of the control circuits 11, 12 and 13 are substantially similar to that of FIG. 2 and are not repeated here.

The switch circuit 14 is coupled and responsive to the primary output voltage Va and relays the output voltage Va as a first power output 421 at terminal 42. Instead of coupling the Voltage signal Va directly, the third control circuit 13 is coupled to and responsive to the first power output 421 and the reference voltage 81. The switch circuit 14 is used to provide a sharply varied input signal 421 to the control circuit 13, so that as the first power input Vc is supplied, the output 421 rises from zero voltage sharply to a level around 13.2 volts.

Figure 5:
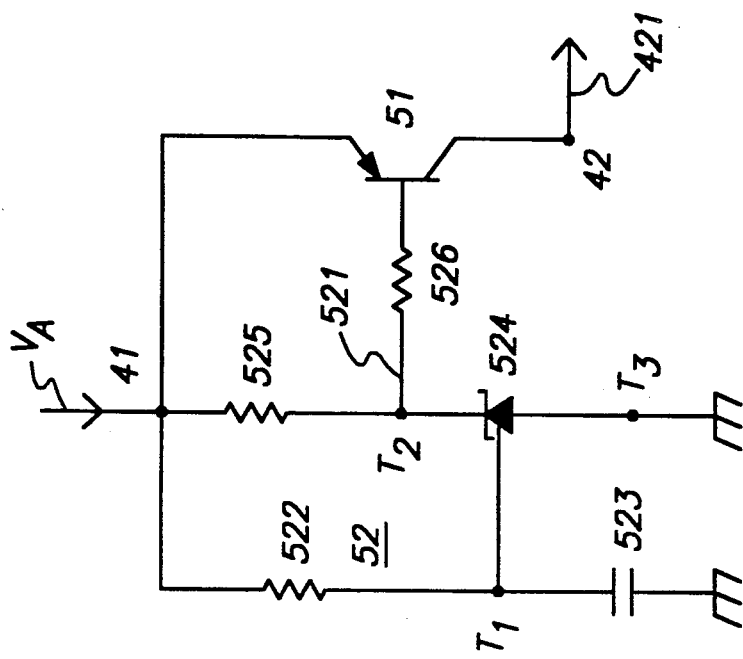
FIG. 5 shows a preferred embodiment of the circuit block 14 of FIG. 4.

A preferred embodiment of the switch circuit 14 is disclosed in FIG. 5. The switch circuit preferably comprises a transistor 51 and a control circuit 52. The transistor 51 has an emitter terminal coupled to the first power input Va, a base terminal and a collector terminal for outputting the first power output 421. The control circuit 52 has an input coupled to the first power input Va for providing a base control signal 521 to the base terminal of the transistor 51. As the first power input Va exceeds a predetermined voltage the transistor 51 is then turned ON to relay the first power input Va to the first power output 421.

Figure 6:
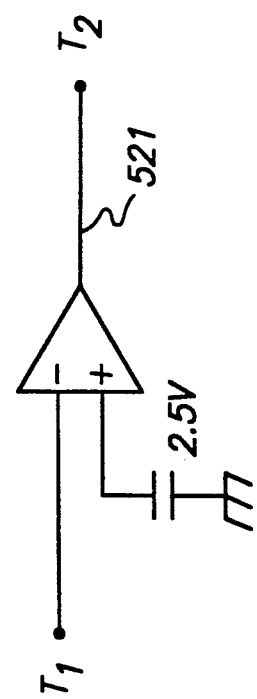
FIG. 6 shows the equivalent circuit of the comparator element 524 of FIG. 5.
Figure 7:
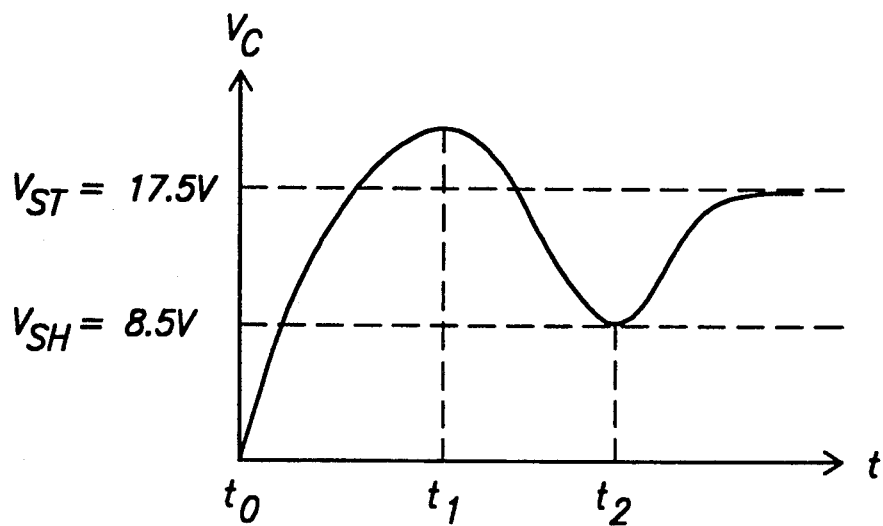
FIG. 7 shows variation of voltage of the node C in FIG. 1 against time.

As shown in FIG. 5, a preferred embodiment of the control circuit 52 comprises a resistor 522, a capacitor 523 and an comparator circuit 524. The capacitor 523 has a first plate coupled to the resistor 522 at a first terminal T1 and has a second plate coupled to the ground. The comparator circuit 524 has the function of an operational amplifier and its equivalent circuit is shown in FIG. 6. The circuit 524 has a control input terminal coupled to the first terminal T1, a terminal T2 for transmitting the base control signal 521 and a terminal T3 coupled to a reference voltage such as ground. A TL431,A series Integrated Circuit made by Motorola or other makers may be utilized as the circuit 524 in the design of FIG. 5. Further information on the TL431,A series Programmable Precision Reference IC is publicly available.

As Va is gradually increased to a nonzero value, this voltage charges the capacitor 523 through resistor 522 and the voltage at node T1 (Vt1) increases to a nonzero value. The voltage at node T2 (Vt2) is HIGH and close to the value of Va as long as Vt1 is below 2.5 volts. As a result, the transistor 51 is OFF and signal 421 is pulled to ground. As Vt1 increases to a value above 2.5 volts, Vt2 drops to 2.5 volts. As a result, the transistor 51 is ON and signal 421 equals the value of Va. In the circuit of FIG. 5, the value of resistor 522 and capacitor 523 decides the time required to have output on signal 421. The circuit 524 functions as a comparator. The transistor 51 functions as a switch and resistor 525 is used to provide a bias voltage for circuit 524 to function properly. The resistor 526 is a current limiting element for transistor 51.

Figure 9:
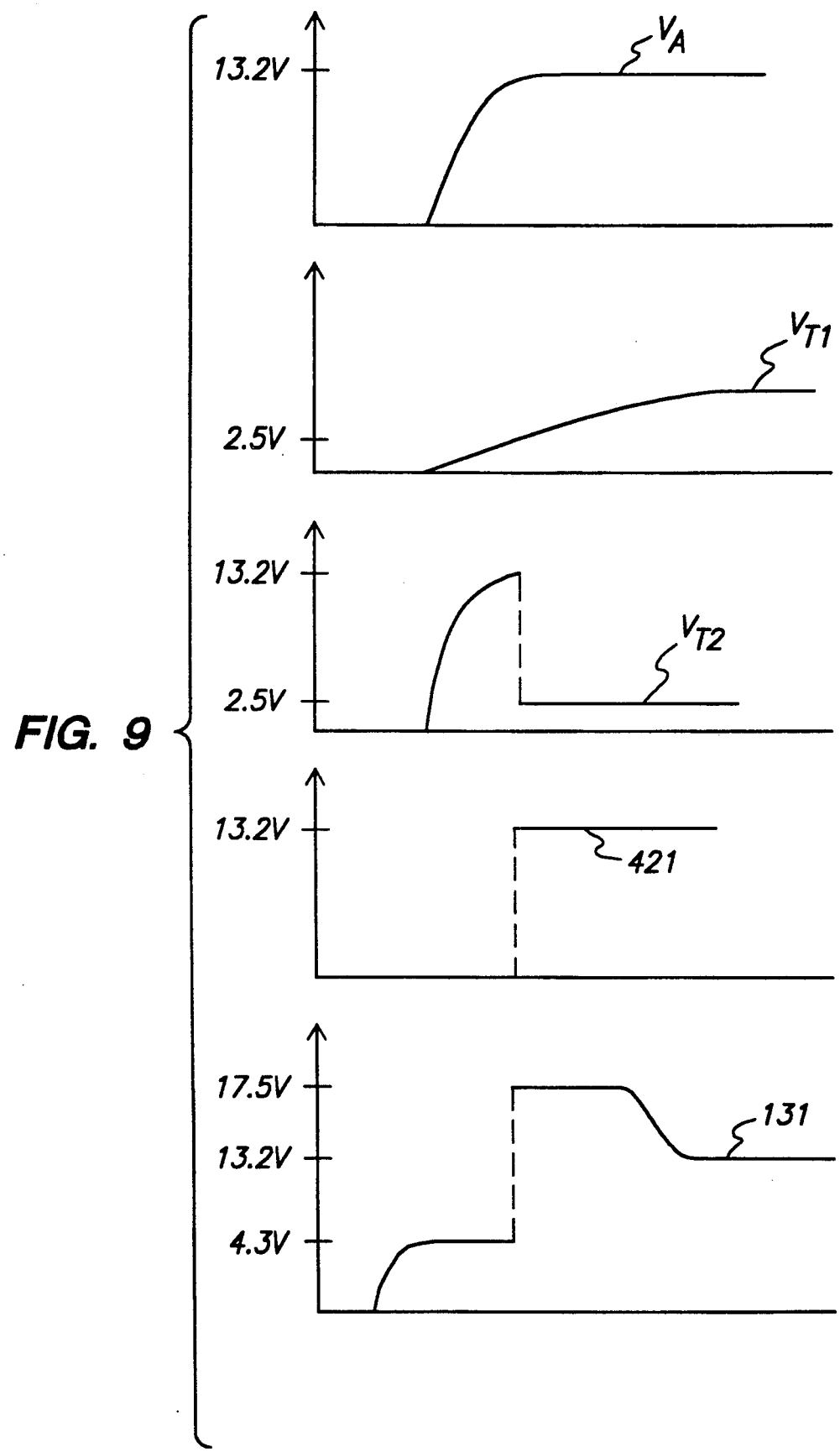
FIG. 9 shows variation of the voltage signals in FIG. 4 and 5.

Variation of the voltage against time at different node of FIG. 5 and FIG. 4 are displayed in FIG. 9.

Compared to FIG. 8, it may be seen the voltage 131 is sharply changed from 4.3 volts to 17.5 volts and then gradually to 13.2 volts.

While the above description provides a full and complete description of the preferred embodiments of the present invention, various modifications, alternate constructions, and equivalents may be employed while still remaining within the scope of the invention. Therefore, the above description and illustrations should not be construed as limiting the scope of the invention which is defined by the following claims.

What is claimed is:

1. A control circuit of a dual switching power supply system, the dual switching power supply system having a first transformer set and second transformer set selectively energized through the control of the ON/OFF state of a first and second switch respectively, the first transformer set having a primary output coil for outputing a primary output voltage, the first and second switch having first and second control input terminals respectively, comprising:

control means for controlling the ON/OFF state of the first switch, the first control means having a first input terminal for receiving a first power input, a first output terminal for outputing a first switch control signal to said first control input terminal and a second output terminal for outputing a reference voltage, the first control means being turned ON when said first power input exceeds a start-up voltage and being turned OFF when said power input drops below a shut-down voltage;

a second control means for providing a power source in response to said primary output voltage and said reference voltage;

a third control means for controlling the ON/OFF state of the second switch, the third control means having a first input terminal for receiving said power source, a first output terminal for outputing a second switch control signal to said second control input terminal, the third control means being turned ON when said power source exceeds the start-up voltage and being turned OFF when said power source drops below the shut-down voltage;

whereby the power source rises from zero voltage to a level above the start-up voltage, thereby turning ON the third control means, as said first power input is supplied, and then the power source drops to a level above the shut-down voltage as the power supply system is operated in a normal condition, and the power source drops to a level well below the shut-down voltage, thereby turning OFF the third control means, if the power supply system is operated abnormally.

2. The control circuit as set forth in claim 1, wherein the first switch is a Metal Oxide Semiconductor (MOS) transistor.

3. The control circuit as set forth in claim 1, wherein the second switch is a MOS transistor.

4. The control circuit as set forth in claim 1, wherein the second control means comprises:
a first diode having an anode coupled to said reference voltage and a cathode;
a capacitor having a positive plate coupled to said cathode and a negative plate coupled to ground through a resistor, the negative plate being coupled to said primary output voltage; and
a second diode, having a cathode coupled to said cathode of the first diode, and interposed between said cathode of the first diode and said negative plate, said power source being output at said positive plate of the capacitor.

5. The control circuit as set forth in claim 1, wherein the start-up voltage is substantially equal to 17.5 volts.

6. The control circuit as set forth in claim 1, wherein the shut-down voltage is substantially equal to 8.5 volts.

7. The control circuit as set forth in claim 2, wherein the first control input terminal is the gate terminal of the MOS transistor.

8. The control circuit as set forth in claim 3, wherein the second control input terminal is the gate terminal of the MOS transistor.

9. The control circuit as set forth in claim 1, wherein the dual switching power supply is used in a multiple frequencies monitor system.

10. The control circuit as set forth in claim 1, wherein the first input terminal of the first control means is adapted to couple to the primary output voltage through a diode.

11. A control circuit of a dual switching power supply system, the dual switching power supply system having a first transformer set and second transformer set selectively energized through the ON/OFF state of a first and second switch respectively, the first transformer set having a primary output coil for outputing a primary output voltage, the first and second switch having first and second control input terminals respectively, comprising:

a first control means for controlling the ON/OFF state of said first switch, the first control means having a first input terminal for receiving a first power input, a first output terminal for outputing a first switch control signal to said first control input terminal and a second output terminal for outputing a reference voltage, the first control means being turned ON when said first power input exceeds a start-up voltage and being turned OFF when said power input drops below a shut-down voltage;

a switch means, coupled and in response to said primary output voltage, for relaying the primary output voltage as a first power output;

a second control means for providing a power source in response to the first power output transmitted from the switch means and the reference voltage;

a third control means for controlling the ON/OFF state of the second switch, the third control means having a first input terminal for receiving said power source, a first output terminal for outputing a second switch control signal to said second control input terminal, the third control means being turned ON when said power source exceeds the start up voltage and being turned OFF when said power source drops below the shut-down voltage;

whereby the power source rises from zero voltage sharply to a level above the start-up voltage, thereby turning ON the third control means, as said first power input is supplied, and then the power source drops to a level above the shut-down voltage as the power supply system is operated in a normal condition, and the power source drops to a level well below the shut-down voltage, thereby turning OFF the third control means, as the power supply system is operated abnormally.

12. The control circuit as set forth in claim 11, wherein the first switch is a Metal Oxide Semiconductor (MOS) transistor.

13. The control circuit as set forth in claim 11, wherein the second switch is a MOS transistor.

14. The control circuit as set forth in claim 11, wherein the second control means comprises:
a first diode having an anode coupled to said reference voltage and a cathode;
a capacitor having a positive plate coupled to said cathode and a negative plate coupled to ground through a resistor, the negative plate being coupled to said primary output voltage; and a second diode, having a cathode coupled to said cathode of the first diode, and interposed between said cathode of the first diode and said negative plate, said power source being output at said positive plate of the capacitor.

15. The control circuit as set forth in claim 11, wherein the start-up voltage is substantially equal to 17.5 volts.

16. The control circuit as set forth in claim 11, wherein the shut-down voltage is substantially equal to 8.5 volts.

17. The control circuit as set forth in claim 12, wherein the first control input terminal is the gate terminal of the MOS transistor.

18. The control circuit as set forth in claim 13, wherein the second control input terminal is the gate terminal of the MOS transistor.

19. The control circuit as set forth in claim 11, wherein the switch means comprises:
a transistor having an emitter terminal coupled to the primary output voltage, a base terminal and a collector terminal for outputing the first power output; and
a control means, in response to the primary output voltage, for providing a base control signal to said base terminal, such that as the primary output voltage exceeds a predetermined voltage the transistor is then turned ON to relay the primary output voltage to the first power output.

20. The control circuit as set forth in claim 19, wherein the control means comprises:
a resistor;
a capacitor with a first plate coupled to said resistor at a first terminal and with a second plate coupled to the ground;
a comparator means for comparing the voltage at said first terminal with a reference voltage to generate the base control signal.

21. The control circuit as set forth in claim 11, wherein the dual switching power supply is used in a multiple frequencies monitor system.

22. The control circuit as set forth in claim 11, wherein the first input terminal of the first control means is adapted to couple to the primary output voltage through a diode.

23. The control circuit as set forth in claim 20, wherein the comparator means is a voltage regulator.

* * * * *